Figure 1:
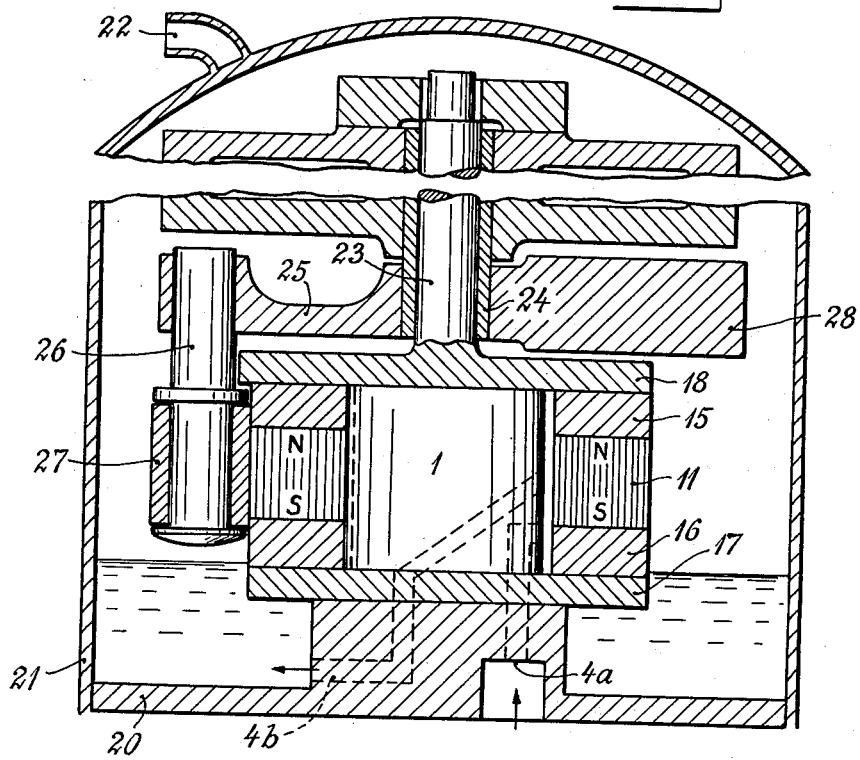

March 2, 1954  S. J. STEENSEN  2,670,895
COMPRESSOR

Filed Nov. 12, 1947  2 Sheets-Sheet 1

Inventor
Sverre J. Steensen
by Sommers & Young
Attorneys

March 2, 1954

S. J. STEENSEN 2,670,895

COMPRESSOR

Filed Nov. 12, 1947

2 Sheets-Sheet 2

Inventor
Sverre J. Steensen
by Sommers & Young
Attorneys

Patented Mar. 2, 1954

2,670,895

UNITED STATES PATENT OFFICE 2,670,895

COMPRESSOR

Sverre Johan Steensen, V. Aker, near Oslo, Norway

Application November 12, 1947, Serial No. 785,364

Claims priority, application Norway November 12, 1946

1 Claim. (Cl. 230—145)

This invention relates to a compressor or pump, which is intended particularly for use with household refrigerating cabinets, and whose rotor rolls around upon the stator excentrically to the latter, the sickle shaped space between both of them being divided by a movable partition. Compressors have already been constructed, in which a magnetic field is used, enabling the encasing of the compressor proper hermetically, and in which the motor may nevertheless be arranged outside the compressor proper.

In such compressors difficulties have been experienced in connection with the building up of a magnetic field, which is strong enough to overcome the necessary air gaps, and owing thereto the magnet dimensions were rather large as compared with the other members of the compressor.

The object of the present invention is to avoid this difficulty to a substantial degree. This is accomplished by the rotor and stator being or operating as two magnetic bodies in direct intimate contact with each other at a rotating contacting line. The magnetic force between the stator and rotor has therefore been increased. The compressor is executed in such a manner that the rotor, in the form of a ring, surrounds the stator and is caused to roll in contact with the stator by means of a rotating magnet field outside the rotor.

The latter may then be surrounded by a stationary thin-walled nonmagnetic cylindrical housing concentric to the stator, and outside which the rotating magnetic field is arranged. The rotor may in this case be permanently magnetic, and the stator is either a magnet or is made of a magnetizable material. The magnetic field may be formed by a ring shaped electromagnet or by a permanent magnet, the object of which then is only to take along with it the rotor magnet during its own rotation. Therefore, it does not need a particularly high magnetic induction, in as much as the rotor itself sticks to the stator along the moving contact line with the same. Therefore, only the rotary movement proper has to be overcome, and as the rotor itself is a magnet, the exterior magnet may also very well be an iron ring, which then operates as an armature. However, greater forces are obtained if the exterior ring is a magnet, whereby the compressor may work with a higher pressure.

If the compressor is used for air or in connection with gases, which do not corrode the motor windings, it may be made particularly simple, as the pump housing, which separates the rotor and the travelling magnet outside the housing, may be dispensed with, and also the travelling magnet proper may be dispensed with. The execution will then be such, that the rotor in the form of a ring, surrounds the stator and is caused to roll in contact with the stator by means of a motor driven roll, which rotates concentrically to the stator in contact with the exterior cylindrical surface of the rotor.

A modification comprises a rotor, in the form of a ring, which is arranged excentrically in the interior of the stator and which is caused to roll upon its interior cylindrical wall by means of a motor driven roller, which rotates concentrically to the said cylindrical wall in contact with the interior cylindrical surface of the rotor.

These constructions do not require any appreciable precision work. An efficiency of up to approximately 100% may be obtained in connection with the pressures, which are required in a refrigerating cabinet, and even at very small numbers of revolutions (about 100 a minute) nearly a complete vacuum is obtained.

Figure 2:
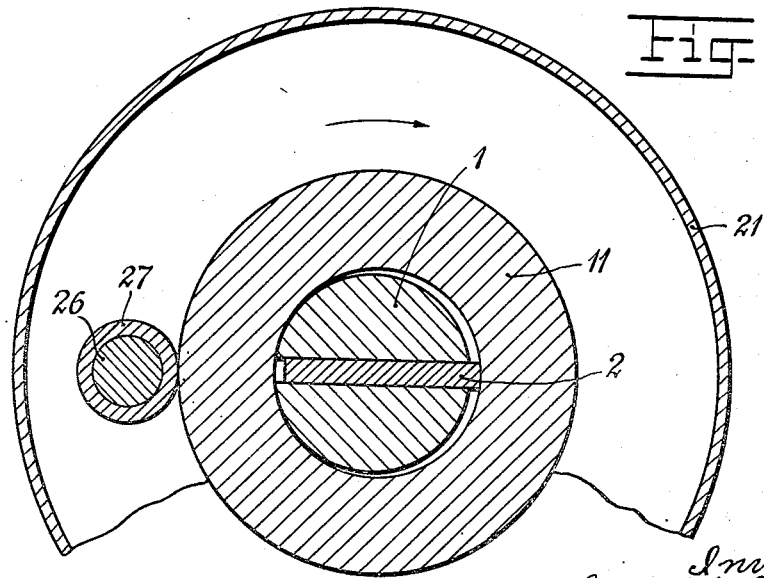
Figure 3:
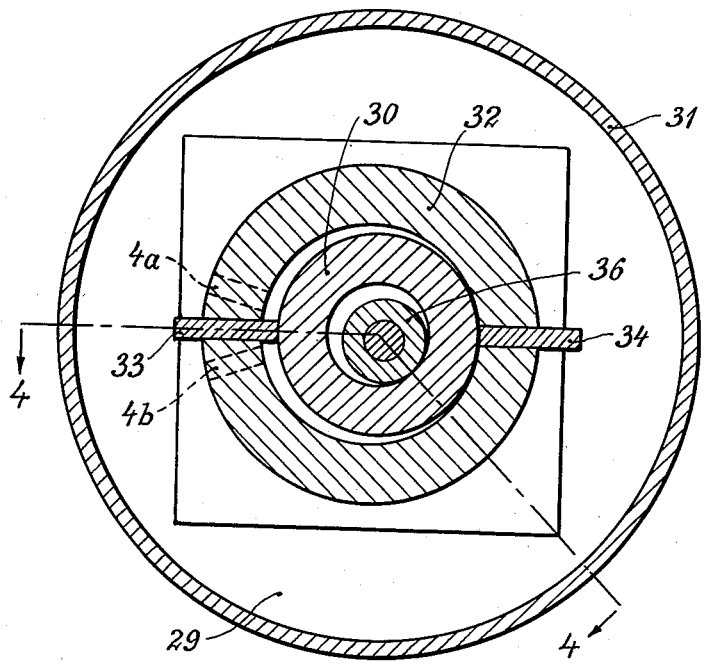
Figure 4:
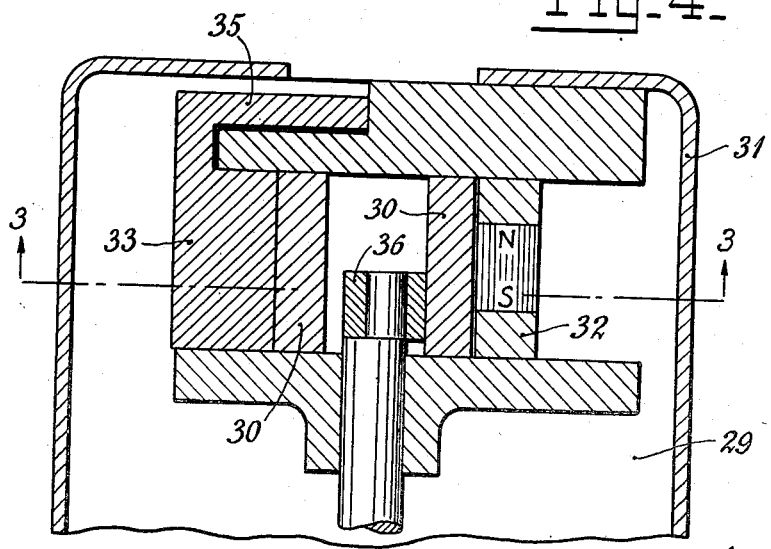

The invention is illustrated by way of example in the accompanying drawings. Figs. 1 and 2 represent an hermetically closed compressor driven by a travelling magnet situated outside the housing and arranged on the motorshaft. Fig. 1 is a cross-section on section line 1—1 of Fig. 2, an exterior housing being removed. Fig. 3 is a longitudinal sectional view and Fig. 4 is a cross-section of a compressor driven by a rotating roll, the motor and the motorshaft being arranged in the interior of a gastight or air tight casing. Fig. 5 represents a third embodiment in cross-section on the line 5—5 of Fig. 6, whereas Fig. 6 is a longitudinal sectional view on the broken central line 6—7 of Fig. 5.

In Fig. 1, reference numeral 1 refers to a stationary stator either of iron or built up as a magnet. Numeral 2 designates a wing or non-magnetizable slide, which divides the space between the rotor and stator in two. In one end of the slide at 3, grooves are formed in order to pass gases over to the pressure side, as long as the rotor lies withdrawn from the stator.

Reference character 4a denotes the pressure channel, and 4b the suction channel. Outside the stator 1 a ring shaped rotor 5 is placed, which is made as a permanent magnet. The rotor rolls upon the outside of the stator, and may also be of an ordinary magnetizable material, if the stator 1 is made as a magnet. Rotor 1 and stator 5 will now be pulled in engagement with one another by the magnet field. As no air gap is present in the contacting line, a forcible pull is obtained here radially, but the rotor may be made easily to roll around the stator 1 by being turned around from outside, for instance, by means of a crank pin. Outside the rotor 5 a sleeve 6 of non-magnetizable material is arranged, which completes the compressor on the outside. Between the rotor 5 and its sleeve 6 there is just a space large enough to enable the rotor to move during its rolling against the stator.

Outside the sleeve 6 travels a magnet 7 eccentrically mounted with respect to the stator, or the member 7 may be an iron ring such as a magnet, if the rotor 5 proper is a magnet. This magnet 7 is attached to a shaft 8 (Fig. 2) and has ringshaped pole shoes 9 and 10. It attracts the rotor 5 during its rotation, without, however pulling the rotor 5 around with it.

In Fig. 2, 11 and 12 show permanent magnet steel rings 13, 14, supporting rings for the pole shoes, whereas 15 and 16 are ring shaped pole shoes for the magnetic ring 11.

The end pieces 17 and 18 of the stator 1 are of nonmagnetic steel. By means of the disk 19, the ring magnet 7 is fixedly connected with shaft 8 on the motor 9.

In Figs. 3 and 4, numeral 1 denotes a stator with the same sliding partition 2 as shown in Fig. 2, the rotor being composed of the members 15, 11 and 16. The rotor is inserted between the end walls 17, 18 that is behind 18, which is of non-magnetic iron. For the rest the compressor is open to the outside. The end wall 17, together with stator 1 and the end wall 18, is screwed fast to the base 20, which has inlet 4a and outlet 4b from the compressor. To the base 20 a container 21 is welded. The compressor proper is now encased in the space, which is limited by the base 20 and the wall of the container 21. The outlet from the pump passes through the channel 4b out into this space and from there through the outlet 22 out of same. The end wall 18 is integral with the bolt 23, which serves for the suspension of the motor.

To the motorshaft 24, which is hollow, is attached the arm 25 with pin 26 and driving roll 27.

As it will be seen, the roll 25 will, when the motor rotates, press the rotor inwards against the stator, so that the contacting line travels around the stator circumference, these two members being pulled against one another by the magnet field. The arm 25, which carries the roll 27, is balanced by a counterweight 28. The rotor surfaces are supplied with lubricant and oil for tightening from the oil in the bottom of container 21, and the motor obtains its lubrication from oil vapour surrounding same.

In Figs. 5 and 6 a construction is shown with the motor encased in the air or gas space 29 and with the rotor 30 arranged inside the encased compressor housing 31.

Here the dimensions of the compressor proper are smaller for the same pump volume, and the compressor proper is shown diagrammatically with rotor 30 and stator 32, both of which or one of which may be magnets constructed in a similar manner as mentioned above. The slide 33, 34 follows the motion of the rotor 30 automatically, as it always engages the rotor wall.

Numeral 36 designates a roll which drives the rotor 30 against the stator 32, and 4a, 4b are the suction and pressure channels in the stator.

The slide is divided into two parts, 33 and 34, and is coupled together by the connecting member 35, so that it follows the motions of the rotor 30. The operation is otherwise the same as in the embodiment shown in Figs. 3 and 4.

The arrangement of the slide may of course be made in other manners without thereby modifying the character of the invention.

I claim:

A compressor, comprising a stator having an interior cylindrical surface, a rotor in the form of a ring within said stator, said stator and said rotor both being magnetized all around their co-operating surfaces and at least one of them being a permanent magnet, said rotor being arranged eccentrically in the interior of the stator so as to be in forcible magnetic contact therewith in all operating positions and to leave in all such positions a crescent-shaped space between it and the stator, a movable partition dividing the said space into a suction and a pressure space, fluid inlet and fluid outlet ports on opposite sides of the partition for passing fluid into the suction space and compressed fluid out from the compression space, a roller arranged eccentrically in the interior of the rotor ring in contact with an axially directed line of its interior cylindrical surface, means for rotating the roller axis mechanically about the axis of the stator's cylindrical surface, so as to cause the rotor to roll inside the stator in the said magnetic contact along an axially directed line on the last-mentioned cylinder surface.

SVERRE JOHAN STEENSEN.

References Cited in the file of this patent

UNITED STATES PATENTS

| Number | Name | Date |
|---|---|---|
| 1,929,996 | Wilson | Oct. 10, 1933 |
| 2,161,374 | Moineau | June 6, 1939 |
| 2,172,500 | Clements | Sept. 12, 1939 |
| 2,399,856 | Coger | May 7, 1946 |
| 2,561,890 | Stoddard | July 24, 1951 |

FOREIGN PATENTS

| Number | Country | Date |
|---|---|---|
| 53,766 | Denmark | Oct. 25, 1937 |
| 70,418 | Norway | May 13, 1946 |
| 762,483 | France | Jan. 22, 1934 |